United States Patent [19]

Reinl

[11] Patent Number: 5,675,862
[45] Date of Patent: Oct. 14, 1997

[54] WINDSHIELD WIPER SHAFT CHANNEL SLEEVE

[75] Inventor: Hans-Georg Reinl, Bergheim, Germany

[73] Assignee: Ford Global Technologies, Inc., Dearborn, Mich.

[21] Appl. No.: 757,058

[22] Filed: Nov. 26, 1996

[30] Foreign Application Priority Data

Dec. 1, 1995 [DE] Germany ............ 195 44 903.7

[51] Int. Cl.⁶ .................... B60S 1/16; B60S 1/06
[52] U.S. Cl. ............ 15/250.31; 15/250.3; 384/276; 384/147; 384/295
[58] Field of Search ............ 15/250.31, 250.3, 15/250.19, 250.16, 250.202, 250.34, 250.21, 250.23; 384/276, 147, 295, 416

[56] References Cited

U.S. PATENT DOCUMENTS

| | | | |
|---|---|---|---|
| 2,965,411 | 12/1960 | Makela | 15/250.31 |
| 3,135,982 | 6/1964 | Carlisle | 15/250.3 |
| 5,067,198 | 11/1991 | Ishikawa et al. | 15/250.31 |
| 5,211,485 | 5/1993 | Hoshino | 384/276 |
| 5,507,585 | 4/1996 | Diederich et al. | 15/250.3 |

FOREIGN PATENT DOCUMENTS 25 39 006  4/1976  Germany.

*Primary Examiner*—Gary K. Graham
*Attorney, Agent, or Firm*—David B. Kelley

[57] ABSTRACT

In a wiper shaft channel sleeve for a protruding wiper shaft (2) of a wiper motor (1) attached to a vehicle outer body component, in which a channel sleeve (5), made of an elastic material, placed in an opening 3 in the vehicle outer skin, is provided with a sliding bearing (6) and a sealing lip (7) and, further, the wiper shaft is supported and protected, the sliding bearing (24) and the sealing lip (28) are placed in a sliding sleeve (22) axially movable in the channel sleeve (5), made of elastic material, and the channel sleeve (5), with its main body of a high-durometer elastic material and, by means of an attachment clip (17) made of a supple elastic material, is rigidly connected to the channel sleeve, and placed in the opening (3) of the body outer skin.

5 Claims, 2 Drawing Sheets

WINDSHIELD WIPER SHAFT CHANNEL SLEEVE

BACKGROUND OF THE INVENTION

1. Field of the Invention

This invention relates to a windshield wiper motor and attached windshield wiper shaft for a motor vehicle.

2. Description of the Prior Art

The present invention concerns a wiper shaft channel sleeve of a wiper shaft joined to a windshield wiper motor. This shaft protrudes from an opening in the vehicle body, and the sleeve is placed around the shaft in the opening to support and seal the shaft. A wiper arm for wiping a windshield of the vehicle is attached to the shaft. The sleeve, which is made of an elastic material, includes a sliding bearing and a sealing lip.

A wiper shaft channel sleeve is disclosed in German patent DE-PS 25 39 006. This known wiper shaft channel sleeve has the disadvantage that its elastic body unsatisfactorily supports the wiper shaft. In addition, the known sleeve contains no means of compensating for the stackup of tolerances in vehicle body components. A further disadvantage of the known sleeve is that the sealing lip provided on the sleeve is completely unprotected against damage during assembly of the wiper arm.

The objective of the present invention is to improve a wiper shaft channel sleeve in such a way that it can be better fitted to the relatively high tolerances of the vehicle body components. This invention also endeavors to provide additional support for and sealing of the wiper shaft.

SUMMARY OF THE INVENTION

The present invention overcomes the deficiencies of the related art by providing a wiper shaft channel sleeve having an axially displaceable sliding sleeve therein. The slide bearings and the sealing lip are directly provided on this sliding sleeve, thus allowing for compensation of vehicle body component tolerances. Rotation of the sliding sleeve with respect to the channel sleeve is prevented via a tappet provided on sliding sleeve that cooperates with a groove on the interior opening of the channel sleeve. The channel sleeve, which consists of a firmly elastic material, and is positioned by means of an attachment clip made of a supple elastic material. This assures that the wiper shaft will be securely supported in the opening of the body outer skin. A tappet provided on the attachment clip cooperates with a stop groove in the body outer skin to ensure proper orientation of the shaft channel sleeve.

As is known to those skilled in the art, a sealing lip is provided where the wiper arm meets the end of the shaft sleeve. The present invention teaches the use of a protective collar axially protruding from this seal which prevents damage of the sealing lip when the wiper arm is installed.

BRIEF DESCRIPTION OF THE DRAWINGS

These and other objects, advantages, and features of the present invention will be apparent to those skilled in vehicle windshield wiper arts upon reading the following description with reference to the accompanying drawings, in which.

DESCRIPTION OF THE PREFERRED EMBODIMENTS

Figure 1:
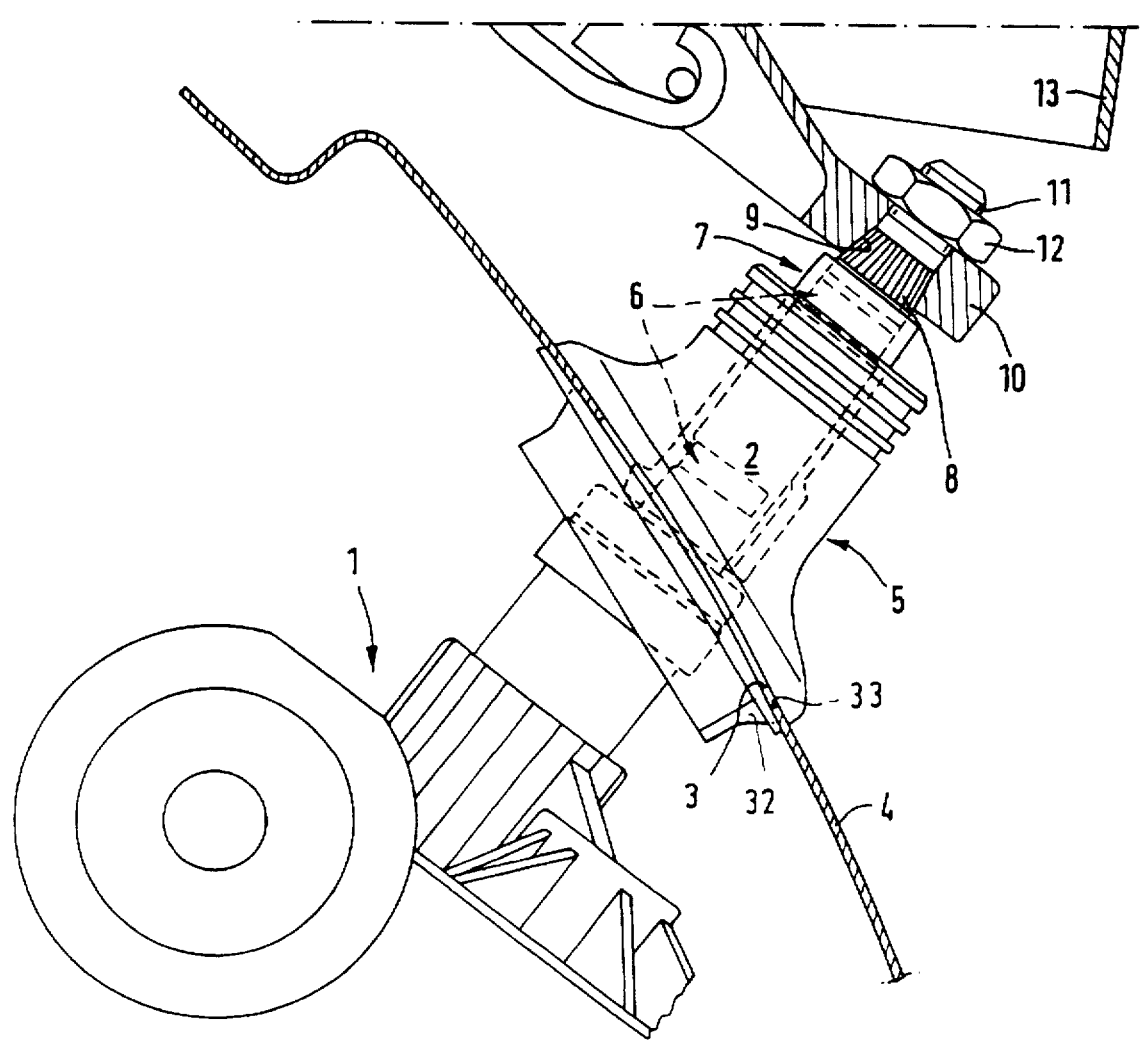
FIG. 1 is a lateral view of a wiper shaft channel sleeve as installed.
Figure 2:
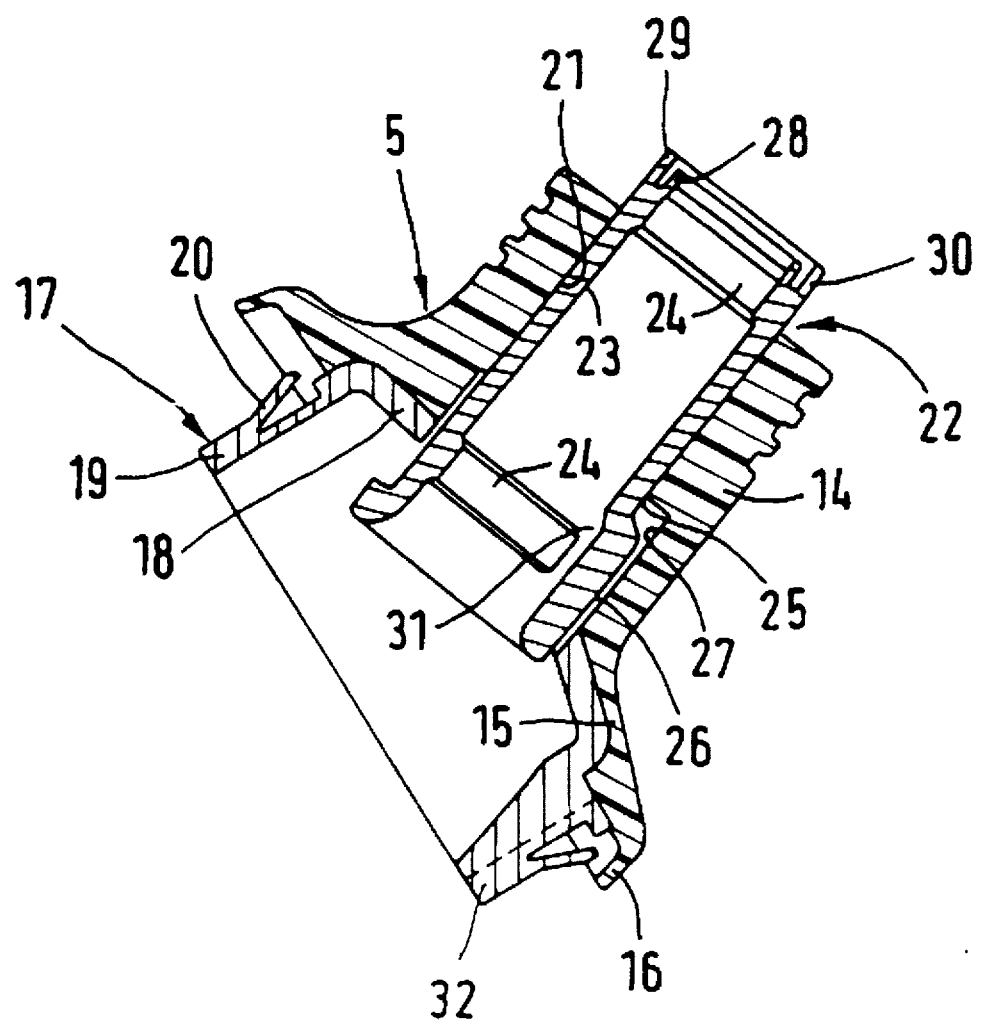
FIG. 2 is a cross-sectional view through the wiper shaft channel sleeve.

In vehicle wiper assembly, a wiper motor 1 is attached on a vehicle body part (not further described) and has a protruding wiper shaft 2 extending through an opening 3 of a body outer surface 4. Shaft 2 is supported and sealed to the outer skin 4 by wiper shaft channel sleeve 5, which is made of a firm elastic material. At the end opposite outer surface 4, sleeve 5 is provided with a sliding bearing 6 and a sealing lip 7.

Wiper shaft 2 is provided with an attachment cone 8 to pick up the attachment hole 9 of a wiper arm 10. Wiper arm 10 is fastened by a nut 12 by means of thread 11 formed on the wiper shaft 2. The attachment 11/12 of the wiper arm 10 is covered in a conventional manner by means of a cap 13.

Channel sleeve 5 consists of a main cylindrical body 14 and a plate-shaped bottom part 15. A sealing flange 16 is disposed on the bottom part 15. An attachment clip 17 of a high-durometer elastic material is also provided on channel sleeve 5, wherein clip 17 has a plate portion 18 and a cylindrical insert with a number of snap-in pins 20. The bottom part 15 of the channel sleeve 5 is connected with the plate part 18 of the attachment clip 17 in a conventional manner. By means of attachment clip 17, the channel sleeve 5 can be sturdily mounted in the opening 3 of the body outer skin 4. The main body 14 of the channel sleeve 5 has an interior opening 21, in which an axially displaceable sliding sleeve 22 with a sliding seat is placed.

On interior periphery 23 of sliding sleeve 22, sliding bearing inserts 24 are provided to facilitate the axial movement of the sliding sleeve. On outer periphery 25 of sliding sleeve 22, a tappet 26 is disposed which interacts with a groove 27 on the interior opening 21 of the channel sleeve 5. This interaction 26/27 prevents the rotation of sliding sleeve 22. On its end adjacent the attachment cone, sliding sleeve 22 is provided with a protective collar 29 axially protruding from the sealing lip 28. This prevents damaging sealing lip 7 when installing the wiper arm 10.

A water drainage slot 30 is disposed on sliding sleeve 22 in the area of the protective collar 29. Similarly, a water drainage groove 31 is disposed in the area of bearing inserts 24. Thus, no water collects in the area adjacent protective collar 29 or bearing inserts 24.

Since the wiper channel sleeve 5 has an asymmetrical design, a radial tappet 32 is provided on its attachment clip 17. Clip 17 cooperates with a stop groove 33 in the opening 3 in the vehicle outer skin 4 to ensure correct installation.

By means of its axially movable sliding sleeve 22, great tolerances can be compensated over the sum of variances of the vehicle body components. A further advantage of the present invention is that the wiper shaft protruding substantially from the channel sleeve 5 is protected all the way up to attachment cone 8 of wiper arm 10 by sliding sleeve 22.

During assembly of the wiper assembly, sliding sleeve 22 is placed in its most outwardly extended position in the channel sleeve 5. Then, sleeve 22 is pressed back by setting the wiper arm 10 upright when the wiper arm 10 strikes the protective collar 29 until the gap between the sliding sleeve and the wiper arm essentially disappears. Accordingly, the sealing lip 28 can perform its function while being protected from damage.

Although the preferred embodiment of the present invention has been disclosed, various changes and modifications may be made without departing from the scope of the invention as set forth in the appended claims.

I claim:

1. A windshield wiper assembly for a motor vehicle with a body outer skin defining a body interior, the assembly comprising:

a wiper motor fixably mounted within the interior of the vehicle;

a wiper shaft mounted to said motor for rotatable motion and protruding through an opening in the body outer skin;

a channel sleeve fixably disposed in the opening and enveloping the shaft exterior to the body outer skin for sealing and supporting the shaft, the channel sleeve having an interior surface and a bore;

a wiper arm fixably mounted on the wiper shaft; and an axially displaceable sliding sleeve slidably disposed between the channel sleeve and the wiper shaft, and having an outer and an inner sliding bearing sealing lip lodged on an outer periphery and an inner periphery, respectively, wherein the sliding sleeve supports the shaft and is displaceable axially to enable engagement of the outer lip with the arm irrespective of spatial variations and tolerance build-up of wiper assembly components.

2. The assembly of claim 1 further comprising:

groove means defining a groove in the interior surface of the channel sleeve; and a tappet, disposed on an outer surface of the sliding sleeve, which cooperates with the groove means to prevent rotation of the sliding sleeve with respect to the channel sleeve.

3. The assembly of claim 2 wherein the outer sealing lip further comprises a protective collar disposed adjacent the inner sealing lip for protecting the inner sealing lip during assembly.

4. The assembly of claim 3 further comprising:

a water drainage slot provided in the protective collar for draining water from the sliding sleeve; and a water drainage groove provided adjacent the sliding bearing for draining water from the sliding sleeve.

5. The assembly of claim 4 further comprising:

an attachment clip with a protruding tappet disposed at the base of the channel sleeve;

a stop groove formed in the body outer skin; and wherein the attachment clip secures the channel sleeve to the outer body skin and the tappet cooperates with the stop groove to assure proper orientation of the channel sleeve during assembly.

\* \* \* \* \*